United States Patent
Chang (10) Patent No.: US 9,778,711 B2
(45) Date of Patent: Oct. 3, 2017

(54) CONTROL DEVICE AND RESET SYSTEM UTILIZING THE SAME

(71) Applicant: Nuvoton Technology Corporation, Hsinchu Science Park (TW)

(72) Inventor: Yao-Chang Chang, Hsinchu Science Park (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 198 days.

(21) Appl. No.: 14/709,056

(22) Filed: May 11, 2015

(65) Prior Publication Data
US 2016/0062389 A1    Mar. 3, 2016

(30) Foreign Application Priority Data
Aug. 26, 2014   (TW) .............................. 103129301 A (51) Int. Cl.
*G06F 1/24* (2006.01)
*H02H 3/247* (2006.01)

(52) U.S. Cl.
CPC ............... *G06F 1/24* (2013.01); *H02H 3/247* (2013.01)

(58) Field of Classification Search
CPC ..... G06F 1/06; G06F 1/10; G06F 1/26; G06F 1/28; G04F 10/04; H02H 3/247; H03K 17/22; H03K 17/223
See application file for complete search history.

(56) References Cited

U.S. PATENT DOCUMENTS

| | | | |
|---|---|---|---|
| 6,040,722 A | 3/2000 | Lee | |
| 6,085,327 A * | 7/2000 | Seng | ........................ G06F 1/24 307/3 |
| 6,198,318 B1 * | 3/2001 | Bhaskaran | ........... H03K 17/223 327/143 |
| 7,015,732 B1 * | 3/2006 | Holloway | ........ G01R 19/16552 327/143 |
| 7,057,427 B2 * | 6/2006 | Wadhwa | ............... H03K 17/223 327/143 |
| 7,388,414 B1 * | 6/2008 | Pasqualini | ........... H03K 17/162 327/142 |
| 7,403,051 B1 * | 7/2008 | Lesea | ............... G01R 19/16552 327/142 |
| 8,198,925 B1 | 6/2012 | Wang | |

* cited by examiner

*Primary Examiner* — Jaweed A Abbaszadeh
*Assistant Examiner* — Brian J Corcoran
(74) *Attorney, Agent, or Firm* — Muncy, Geissler, Olds & Lowe, P.C.

(57) ABSTRACT

A control device is provided. A first counting unit counts and generates a first output signal. When a counting value of the first counting unit is equal to a first pre-determined value, the first output signal is at a first level. When the counting value of the first counting unit is not equal to the first pre-determined value, the first output signal is at a second level. A second counting unit counts and generates a second output signal. When a counting value of the second counting unit is equal to a second pre-determined value, the second output signal is at the second level. When the counting value of the second counting unit is not equal to the second pre-determined value, the second output signal is at the first level. A determination unit generates a reset signal according to the levels of the first and second output signals.

8 Claims, 6 Drawing Sheets

CONTROL DEVICE AND RESET SYSTEM UTILIZING THE SAME

CROSS REFERENCE TO RELATED APPLICATIONS

This Application claims priority of Taiwan Patent Application No. 103129301, filed on Aug. 26, 2014, the entirety of which is incorporated by reference herein.

BACKGROUND OF THE INVENTION

Field of the Invention

The invention relates to a control device, and more particularly to a control device which is capable of generating a reset signal.

Description of the Related Art

The electrical elements of a circuit are operated according to the level of a power terminal. After the power terminal receives power, a reset circuit first sends a reset signal to reset the electrical elements. In a reset mode, the electrical elements are initiated and then start operating after the initiation. However, before the electrical elements begin operating, if the level of the power terminal is varied slightly, the conventional reset circuit may send the reset signal again to initialize the electrical elements to enter the reset mode. However, in the reset mode the electrical elements are temporarily deactivated, so if the conventional reset circuit is disposed in a vehicle to control the electrical elements of the vehicle, the vehicle may work abnormally while the electrical elements are temporarily deactivated, and it may cause great damage.

BRIEF SUMMARY OF THE INVENTION

In accordance with an embodiment, a control device comprises a clock controller, a first counting unit, a second counting unit, and a determination unit. The clock controller generates a first control signal and a second control signal. The first counting unit counts according to the first control signal and generates a first output signal. When a counting value of the first counting unit is equal to a first pre-determined value, the first output signal is at a first level. When the counting value of the first counting unit is not equal to the first pre-determined value, the first output signal is at a second level. The second counting unit counts according to the second control signal and generates a second output signal. When a counting value of the second counting unit is equal to a second pre-determined value, the second output signal is at the second level. When the counting value of the second counting unit is not equal to the second pre-determined value, the second output signal is at the first level. The determination unit generates a reset signal according to the levels of the first and second output signals.

In accordance with another embodiment, a reset system comprises a voltage detection device and a control device. The voltage detection device generates a pre-reset signal according to a power signal. The control device comprises a clock controller, a first counting unit, a second counting unit, and a determination unit. The clock controller generates a first control signal and a second control signal according to a level of the pre-reset signal when a level of the power signal is higher than a pre-determined voltage level. The first counting unit counts according to the first control signal and generates a first output signal. When a counting value of the first counting unit is equal to a first pre-determined value, the first output signal is at a first level. When the counting value of the first counting unit is not equal to the first pre-determined value, the first output signal is at a second level. The second counting unit counts according to the second control signal and generates a second output signal. When a counting value of the second counting unit is equal to a second pre-determined value, the second output signal is at the second level. When the counting value of the second counting unit is not equal to the second pre-determined value, the second output signal is at the first level. The determination unit generates a reset signal according to the levels of the first and second output signals.

In accordance with a further embodiment, a control method comprises following steps. A first control signal and a second control signal are generated, and a first counting operation is executed according to the first control signal to generate a first counting value and generating a first output signal according to the first counting value. When the first counting value is equal to a first pre-determined value, the first output signal is at a first level, and when the first counting value is not equal to the first pre-determined value, the first output signal is at a second level. A second counting operation is executed according to the second control signal to generate a second counting value and generating a second output signal according to the second counting value. When the second counting value is equal to a second pre-determined value, the second output signal is at the second level, and when the second counting value is not equal to the second pre-determined value, the second output signal is at the first level. A reset signal is generated according to levels of the first and second output signals.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
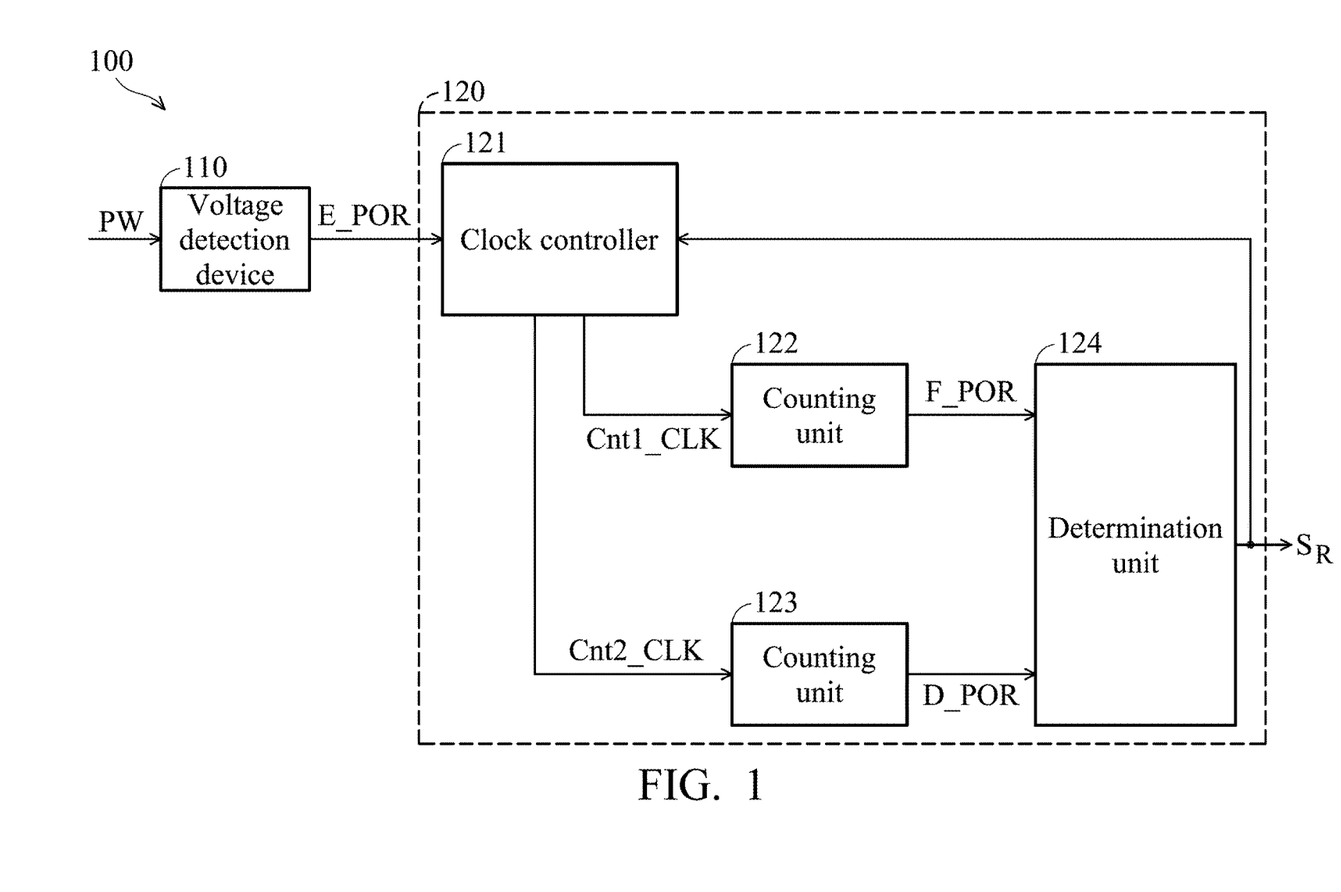
FIG. 1 is a schematic diagram of an exemplary embodiment of a reset system, in accordance with some embodiments.

FIG. 1 is a schematic diagram of an exemplary embodiment of a reset system, in accordance with some embodiments. The reset system 100 comprises a voltage detection device 110 and a control device 120. In this embodiment, the reset system 100 generates a reset signal $S_R$ to reset electrical elements (not shown in FIG. 1) according to the level of the power signal PW.

For example, when the level of the power signal PW is equal to a pre-determined voltage level, the reset system 100 directs the level of the reset signal $S_R$ at a reset level to reset the electrical elements which receive the reset signal $S_R$. After the electrical elements are reset upon receipt of the reset signal $S_R$, the electrical elements are capable of working normally. However, if a glitch event occurs in a power terminal, the level of the power signal output from the power terminal is disturbed. Therefore, in this embodiment, when the level of the power signal PW is lower than the pre-determined voltage level, the reset system 100 directs the level of the reset signal $S_R$ at a non-reset level or at the reset level according a pre-determined condition such that the electrical elements, which receive the reset signal $S_R$, are not reset or they are reset.

In one embodiment, the reset system 100 selectively filters glitches with different variations. For example, when the variation of a glitch is lower than a pre-determined value, it means that the electrical elements, which receive the reset signal $S_R$, are not affected by the glitch. Therefore, the reset system 100 ignores the glitch and does not reset the electrical elements which receive the reset signal $S_R$. However, when the variation of another glitch is higher than the pre-determined value, it means that the disturbance of the power signal PW affects the operations of the electrical elements which receive the reset signal $S_R$. Therefore, the reset system 100 utilizes the reset signal $S_R$ to reset the electrical elements which receive the reset signal $S_R$.

Figure 3A:
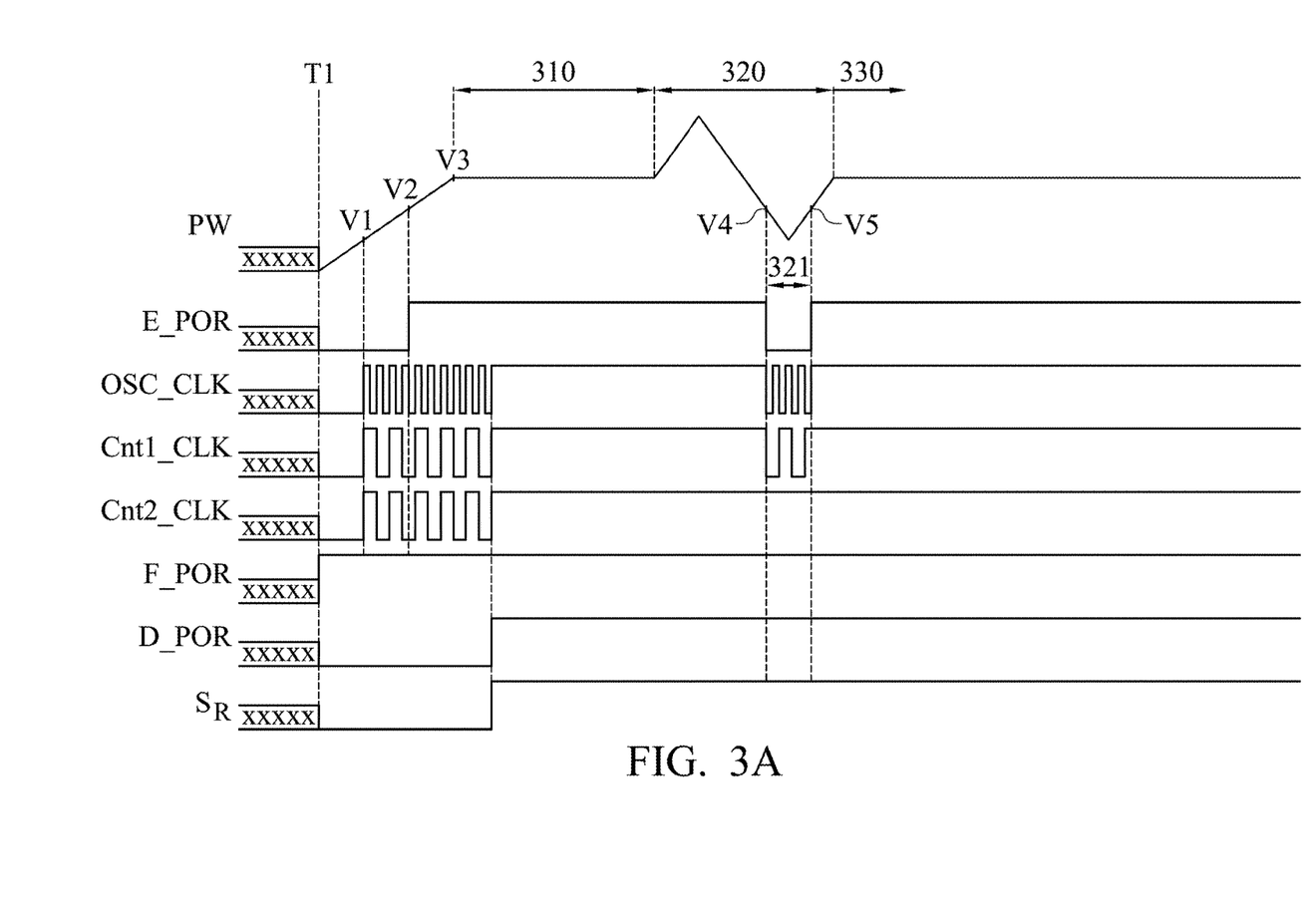
FIG. 3A is a timing schematic diagram of an exemplary embodiment of the control device, in accordance with some embodiments.

The voltage detection device 110 detects the level of the power signal PW to determine whether the level of the power signal PW has been disturbed, and generates a pre-reset signal E_POR according to the determination result. Refer to FIG. 3A, the level of the power signal PW and the pre-reset signal E_POR are unknown level previous to providing power to the power terminal (i.e. before time point T1).

At time point T1, the power terminal receives power. The level of the power signal PW is gradually increased, and the level of the pre-reset signal E_POR is changed from an unknown level to a low level. When the level of the power signal PW is higher than the voltage level V2, the level of the pre-reset signal E_POR is changed from the low level to a high level.

During period 310, the power signal PW is maintained at the voltage level V3 and the level of the pre-reset signal E_POR is at the high level. However, during period 320, a glitch occurs in the power terminal such that the level of the power signal PW is disturbed and is not maintained at the voltage level V3. When the level of the power signal PW is less than the voltage level V4, the level of the pre-reset signal E_POR is changed from the high level to the low level. When the level of the power signal PW is higher than the voltage level V5, the level of the pre-reset signal E_POR is changed again from the low level to the high level.

In this embodiment, the voltage levels V2, V4 and V5 are the same. In another embodiment, the voltage level V4 is higher than the voltage level V2. During the period 330, the level of the power signal PW is maintained at the voltage level V3 again. Therefore, the level of the pre-reset signal E_POR is also maintained at the high level.

Refer back to FIG. 1: the control device 120 generates the reset signal $S_R$ according to the pre-reset signal E_POR. In one embodiment, the control device 120 determines the duration of period 321 and controls the level of the reset signal $S_R$ according to the duration of period 321. For example, when the duration during which the pre-reset signal E_POR is kept at a low level for a pre-determined time, this means that the variation of the glitch is large. Therefore, the control device 120 sets the level of the reset signal $S_R$ to the reset level, such as a low level, to reset the electrical elements which receive the reset signal $S_R$.

However, more glitches have small variations and do not affect the electrical elements which receive the reset signal $S_R$. Therefore, when the pre-reset signal E_POR is changed to the low level due to a glitch with a small variation and the duration is not kept at the low level for the pre-determined time, the control device 120 sets the level of the reset signal $S_R$ to a non-reset level, such as a high level. Thus, the electrical elements which receive the reset signal $S_R$, are not reset and the entire operation system can be ensured to work normally.

For example, in the movement of vehicles, if the power signal of a chip is affected by an unexpected event, such as the glitch, when the control device 120 resets the system of the vehicles due to the glitch, the vehicles may be temporarily disabled causing danger to the driver and passengers. Therefore, in one embodiment, the control device 120 ignores all or a portion of glitches according to the variations of the glitches.

In this embodiment, the control device 120 comprises a clock controller 121, counting units 122 and 123, and a determination unit 124. When the pre-reset signal E_POR is at the low level and the level of the power signal PW is higher than a voltage level (e.g. the voltage level V1 shown in FIG. 3A), the clock controller 121 and the counting units 122 and 123 are activated. The clock controller 121 starts generating control signals Cnt1_CLK and Cnt2_CLK. In one embodiment, the control signals Cnt1_CLK and Cnt2_CLK are clock signals.

The counting unit 122 executes a first counting operation according to the control signal Cnt1_CLK to generate a first counting value, and the first counting value is then compared with a first pre-determined value to generate an output signal F_POR. In this embodiment, the counting unit 122 is configured to determine the duration of the pre-reset signal E_POR being at the low level. Furthermore, the first pre-determined value is written into the counting unit 122 in advance, or an external device provides the first pre-determined value to the counting unit 122.

When the first counting value is equal to the first pre-determined value, it means that the pre-reset signal E_POR is kept at the low level for a pre-determined time. The counting unit 122 sets the level of the output signal F_POR to a first level, such as a low level, such that the level of the reset signal $S_R$ is at a reset level. When the first counting value is not equal to the first pre-determined value, it means that the pre-reset signal E_POR is not kept at the low level for the pre-determined time, so the counting unit 122 directs the output signal F_POR to a second level, such as a high level.

The counting unit 123 executes a second counting operation according to the control signal Cnt2_CLK to generate a second counting value and compares the second counting value with a second pre-determined value to generate an output signal D_POR. In this embodiment, the counting unit 123 is configured to determine whether the level of the power signal PW quickly reaches a pre-determined voltage level.

For example, when the second counting value is equal to the second pre-determined value, the output signal D_POR is at the second level. When the second counting value is not equal to the second pre-determined value, the output signal D_POR is at the first level.

The determination unit 124 generates the reset signal $S_R$ and sets the level of the reset signal $S_R$ according to the output signals F_POR and D_POR. In this embodiment, when at least one of the output signals F_POR and D_POR is at the first level (e.g. the low level), the determination unit 124 directs the level of the reset signal $S_R$ to a reset level, such as the low level, to reset the electrical elements which receive the reset signal $S_R$. When each of the output signals F_POR and D_POR are at the second level (e.g. the high level), the determination unit 124 directs the level of the reset signal $S_R$ to a non-reset level, such as the high level.

In this embodiment, the clock controller 121 deactivates or activates the counting unit 122 and 123 according to the level of the reset signal $S_R$. For example, when the reset signal $S_R$ is at the first level, the clock controller 121 activates the counting units 122 and 123. In another embodiment, the clock controller 121 deactivates or activates the counting units 122 and 123 according to the levels of the output signals F_POR and D_POR. For example, when each of the output signals F_POR and D_POR is at the second level, the clock controller 121 deactivates the counting units 122 and 123 to stop the first and second counting operations and reduce power consumption.

The invention does not limit types of the first and second levels. In one embodiment, the first level is a low level, the second level is a high level, and the high level is higher than the low level. In another embodiment, the first level is a high level, and the second level is a low level.

Figure 2:
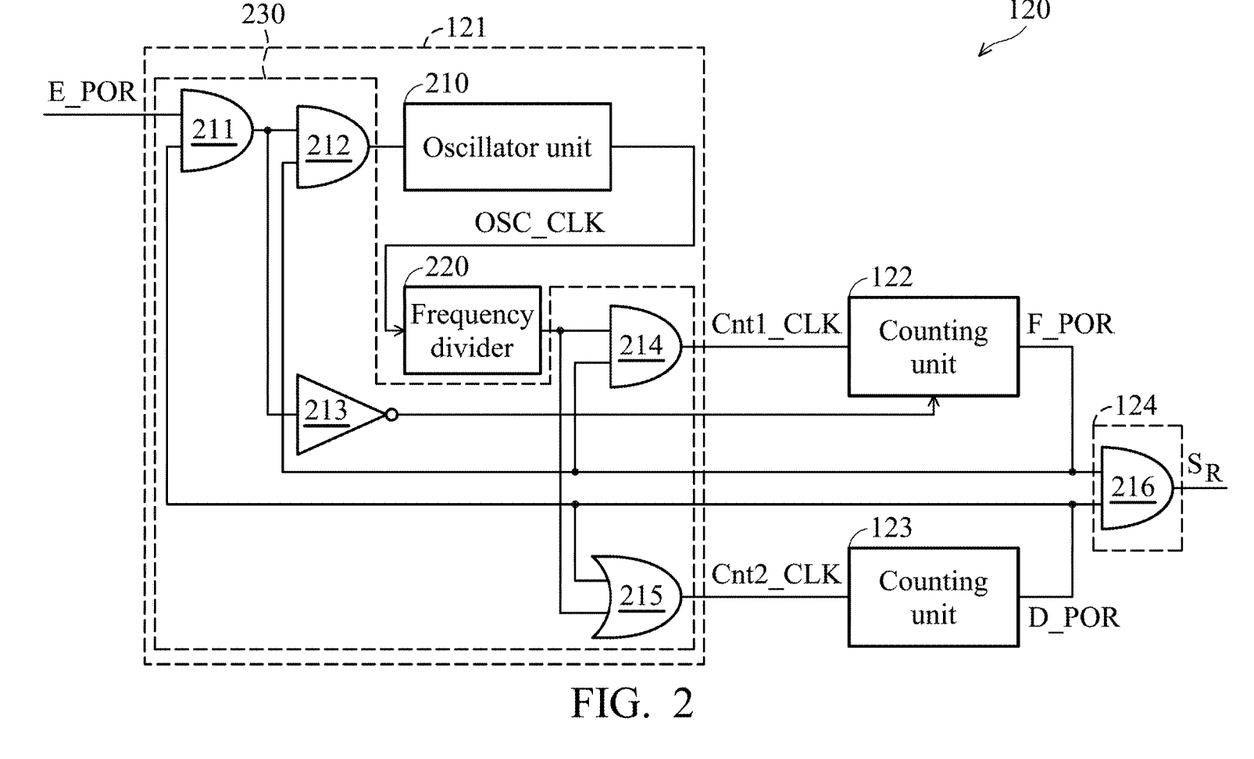
FIG. 2 is a schematic diagram of an exemplary embodiment of a clock controller, in accordance with some embodiments.

FIG. 2 is a schematic diagram of an exemplary embodiment of a clock controller, in accordance with some embodiments. The clock controller 120 comprises an oscillator unit 210, a frequency divider 220 and a control unit 230. In some embodiments, the control unit 230 can be a unit independent from the clock controller 121.

The oscillator unit 210 generates an oscillating signal OSC_CLK according to the output of the control unit 230. The frequency divider 220 changes the frequency of the oscillating signal OSC_CLK. The control unit 230 generates the control signals Cnt1_CLK and Cnt2_CLK according to the output of the frequency divider 220 to obtain the output signals F_POR and D_POR. In other embodiments, if the oscillator unit 210 is capable of generating appropriate oscillating signal, the frequency divider 220 can be omitted.

The control unit 230 generates the control signal Cnt1_CLK according to the output signal F_POR and the output of the frequency divider 220 and generates the control signal Cnt2_CLK according to the output signal D_POR and the output of the frequency divider 220. When the pre-reset signal E_POR is at the low level and the level of the power signal PW is higher than a voltage level (e.g. the voltage level V1 shown in FIG. 3A), the control unit 230 activates the oscillator unit 210, counting units 122 and 123 to determine whether the variation of the power signal PW is too large and whether the power signal PW quickly reaches a pre-determined voltage level. When each of the output signals F_POR and D_POR is at the high level, the control unit 230 deactivates at least one of the oscillator unit 210, the counting units 122 and 123 to reduce the power consumption.

In this embodiment, the control unit 230 comprises logic gates 211-215 to deactivate or activate the oscillator unit 210, counting units 122 and 123. The invention does not limit the circuit structure of the control unit 230. In some embodiments, any logic circuit can serve as the control unit 230, as long as the logic circuit is capable of achieving the above functions relating to the control unit. Additionally, in this embodiment, the determination unit 124 is an AND gate 216, but the present disclosure is not limited thereto. In some embodiments, other logic combination can accomplish the functions of the determination unit 124.

FIG. 3A is a timing schematic diagram of an exemplary embodiment of the control device, in accordance with some embodiments. Before the time point T1, no power is provided. Therefore, the levels of the power signal PW, the pre-reset signal E_POR, the oscillating signal OCK_CLK, the control signals Cnt1_CLK and Cnt2_CLK, the output signals F_POR and D_POR and the reset signal $S_R$ are unknown.

After the time point T1, the power terminal receives power. Therefore, the level of the power signal PW is gradually increased such that the pre-reset signal E_POR is at the low level. When the level of the power signal PW reaches the voltage level V1, the oscillator unit 210 starts generating the oscillating signal OSC_CLK and the control unit 230 provides the control signals Cnt1_CLK and Cnt2_CLK according to the oscillating signal OSC_CLK. Thus, the counting units 122 and 123 start counting.

When the counting value of the counting unit 122 is not equal to the first pre-determined value, the output signal F_POR is at the high level. Since the counting value of the counting unit 123 is not equal to the second pre-determined value, the output signal D_POR is at the low level. At this time, since the output signal F_POR is at the high level and the output signal D_POR is at the low level, the reset signal $S_R$ is at the low level.

When the counting value of the counting unit 123 is equal to the second pre-determined value, the output signal D_POR is at the high level. At this time, since each of the output signals F_POR and D_POR is at the high level, the reset signal $S_R$ is at the high level. In this embodiment, the control unit 230 deactivates the oscillator unit 210 and the counting units 122 and 123. Therefore, the oscillating signal OSC_CLK and the control signals Cnt1_CLK and Cnt2_CLK are at the high level.

During the period 320, since a glitch occurs in the power terminal, the level of the power signal is disturbed. During the period 321, the level of the power signal PW is less than the voltage level V4 such that the pre-reset signal E_POR is at the low level. At this time, the control unit 230 activates the oscillator unit 210 to generate the oscillating signal OSC_CLK. The control unit 230 generates the control signals Cnt1_CLK and Cnt2_CLK according to the oscillating signal OSC_CLK.

In this embodiment, the counting unit 123 is configured to determine whether the level of the power signal PW quickly reaches a pre-determined voltage level. During the period 321, the level of the power signal PW is not lower than 0V such that the counting unit 123 does not work. Thus, the output signal D_POR is maintained at the high level. At this time, the counting unit 122 starts counting according to the control signal Cnt1_CLK to determine the duration of the period 321. Since the counting value of the counting unit 122 is not equal to the first pre-determined value, the output signal F_POR is at the high level. Since the output signals F_POR and D_POR are at the high level, the reset signal $S_R$ is also at the high level and no electrical element, which receive the reset signal $S_R$, is reset. During the period 330, since the reset signal $S_R$ is at the high level, at least one of the oscillator unit 210 and the counting units 122 and 123 is deactivated.

Figure 3B:
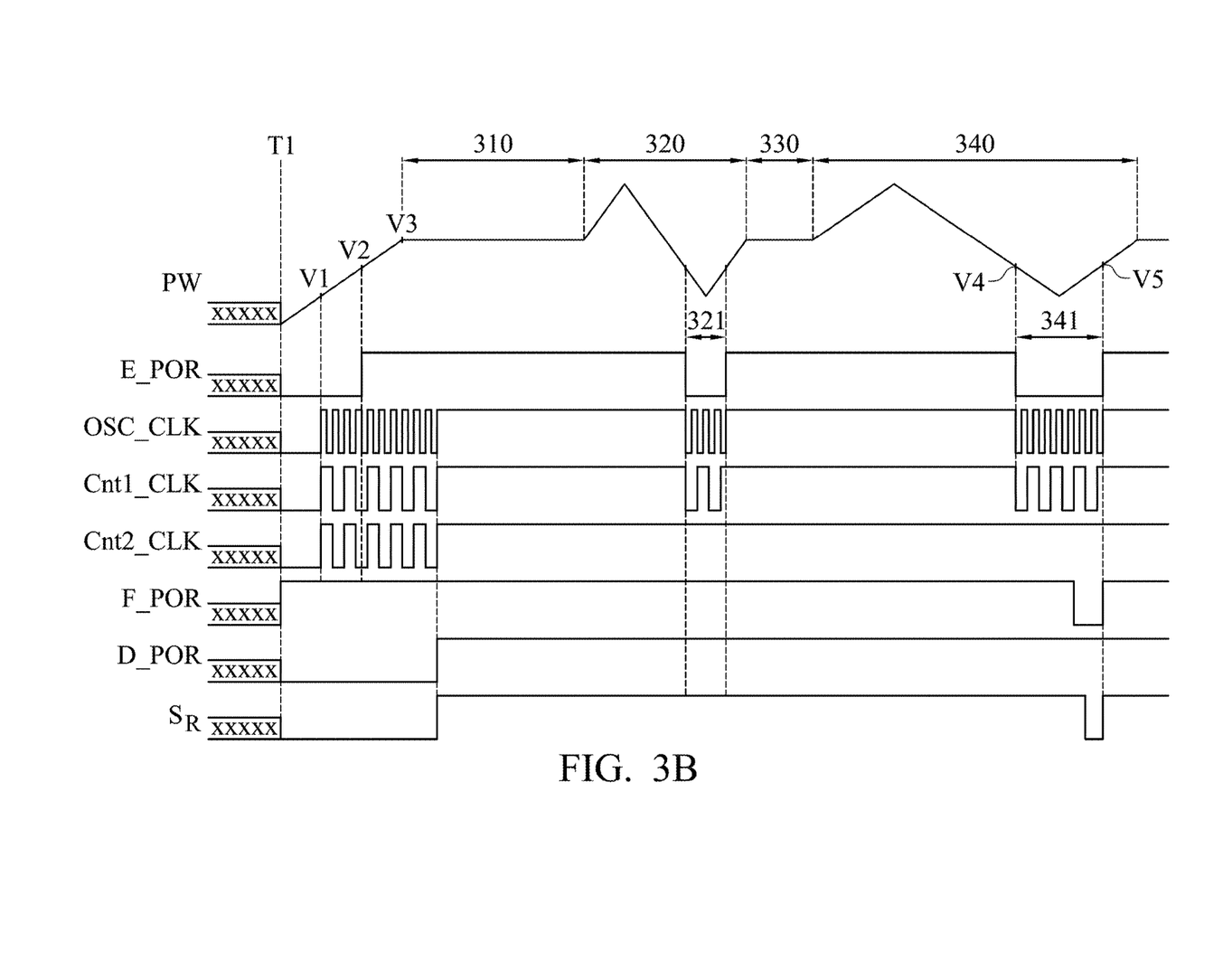
FIG. 3B is another timing diagram of another exemplary embodiment of the control device, in accordance with some embodiments.

FIG. 3B is another timing diagram of another exemplary embodiment of the control device, in accordance with some embodiments. FIG. 3B is similar to FIG. 3A with the exception that the glitch shown in FIG. 3B is greater than the glitch shown in FIG. 3A. In FIG. 3A, since the duration of the glitch in the period 320 is not great, the glitch in the period 320 is ignored. Therefore, the reset signal $S_R$ is at the high level during the period 321. However, in FIG. 3B, since the glitch in period 340 is great, the reset signal $S_R$ is at the low level during the period 341.

As shown in FIG. 3B, during the period 341, the level of the power signal PW is less than the voltage level V4 such that the pre-reset signal E_POR is at the low level. Therefore, the counting unit 122 starts counting. Since the duration of the period 341 is longer than a pre-determined value, the counting value of the counting unit 122 is equal to the first pre-determined value such that the output signal F_POR is at the low level. In this embodiment, the counting unit 123 is configured to determine whether the level of the power signal PW quickly reaches a pre-determined voltage level. During the period 341, the level of the power signal PW is not lower than 0V. The counting unit 123 does not work such that the output signal D_POR is maintained at the high level. At this time, the reset signal $S_R$ is at the low level to reset the electrical elements which receive the reset signal $S_R$.

Figure 4A:
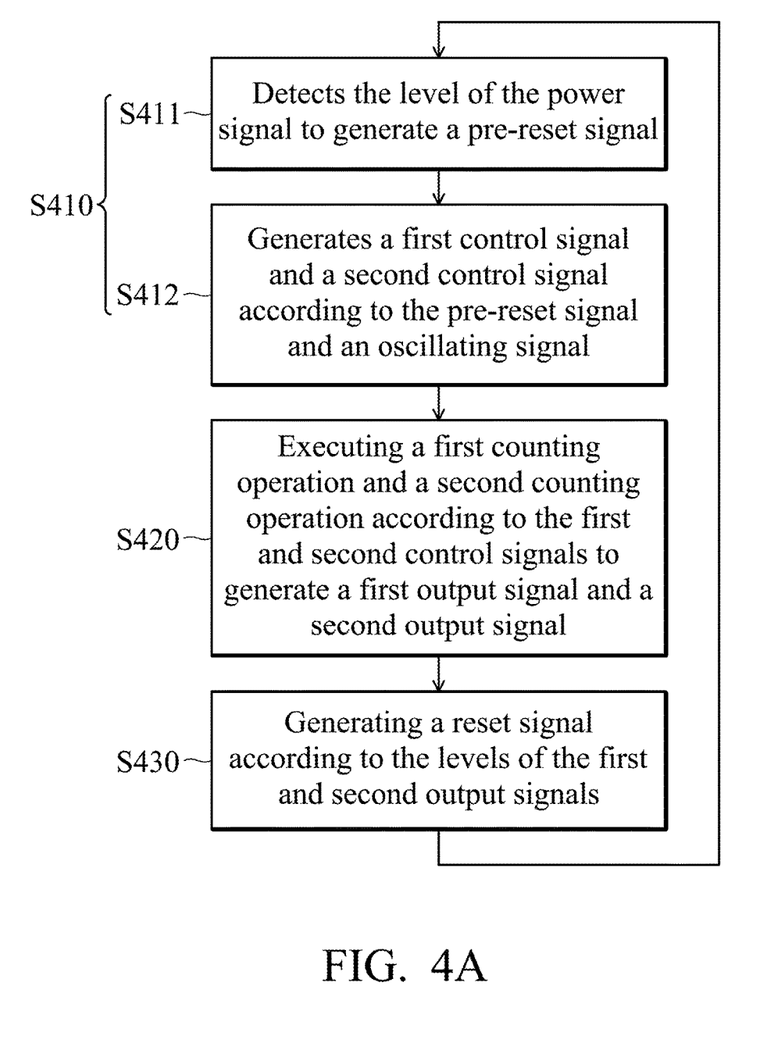
FIG. 4A is a flowchart of an exemplary embodiment of a control method, in accordance with some embodiments.

FIG. 4A is a flowchart of an exemplary embodiment of a control method, in accordance with some embodiments. A first control signal and a second control signal are generated according to a power signal (step S410). In this embodiment, step 410 determines whether a power terminal receives power and a glitch occurs in the power terminal.

In one embodiment, step S410 comprises steps S411 and S412. In the step S411 the level of the power signal is detected to generate a pre-reset signal. When the level of the power signal is higher than a first voltage level (e.g. the voltage level V2 shown in FIG. 3A), the pre-reset signal is at a second level. When the level of the power signal is lower than the first voltage level, the pre-reset signal is at a first level. In other embodiments, when the level of the power signal is lower than a second voltage level (e.g. the voltage level V4 shown in FIG. 3A), the pre-reset signal is at the first level. The second voltage level is equal to the first voltage level. In another embodiment, the second voltage level is higher than the first voltage level.

In the step S412, a first control signal and a second control signal are generated according to the pre-reset signal and an oscillating signal. In one embodiment, in the step S412 an oscillator circuit is activated first to generate the oscillating signal according to the level of the pre-reset signal when the level of the power signal is higher than a second voltage level (e.g. the voltage level V1 shown in FIG. 3A). The first voltage level is higher than the third voltage level. Then, in the step S412 the first and second control signals are generated according to the oscillating signal. The first and second control signals are clock signals.

A first counting operation is executed to generate a first output signal according to the first control signal and a second counting operation is executed to generate a second output signal according to the second control signal (step S420). In this embodiment, the first counting operation is utilized to determine the variation of a glitch event. When the value of the count by the first counting operation reaches a first pre-determined value, the first output signal is at a first level. When the value of the count by the first counting operation does not reach the first pre-determined value, the first output signal is at a second level. In another embodiment, when the pre-reset signal is at the first level, the first counting operation is executed.

In another embodiment, the second counting operation is utilized to determine whether the power signal in the power terminal quickly reaches a pre-determined voltage level. When the value of the count by the second counting operation reaches a second pre-determined value, the second output signal is at the second level. When the value of the count by the second counting operation does not reach the second pre-determined value, the second output signal is at the first level. In other embodiments, when the level of the power signal is gradually increased from 0V, the second counting operation is executed. In some embodiments, when the level of the power signal is not lower than 0V, the second counting operation is not executed.

A reset signal is generated according to the levels of the first and second output signals (step S430). In one embodiment, when the levels of the first and second output signals are at the second level, the reset signal is also at the second level. When at least one of the first and second output signals is at the first level, the reset signal is also at the first level to reset the electrical elements which receive the reset signal $S_R$.

After generating the reset signal, step S410 is performed. In one embodiment, step S410 generates the first and second control signals according to the power signal.

Figure 4B:
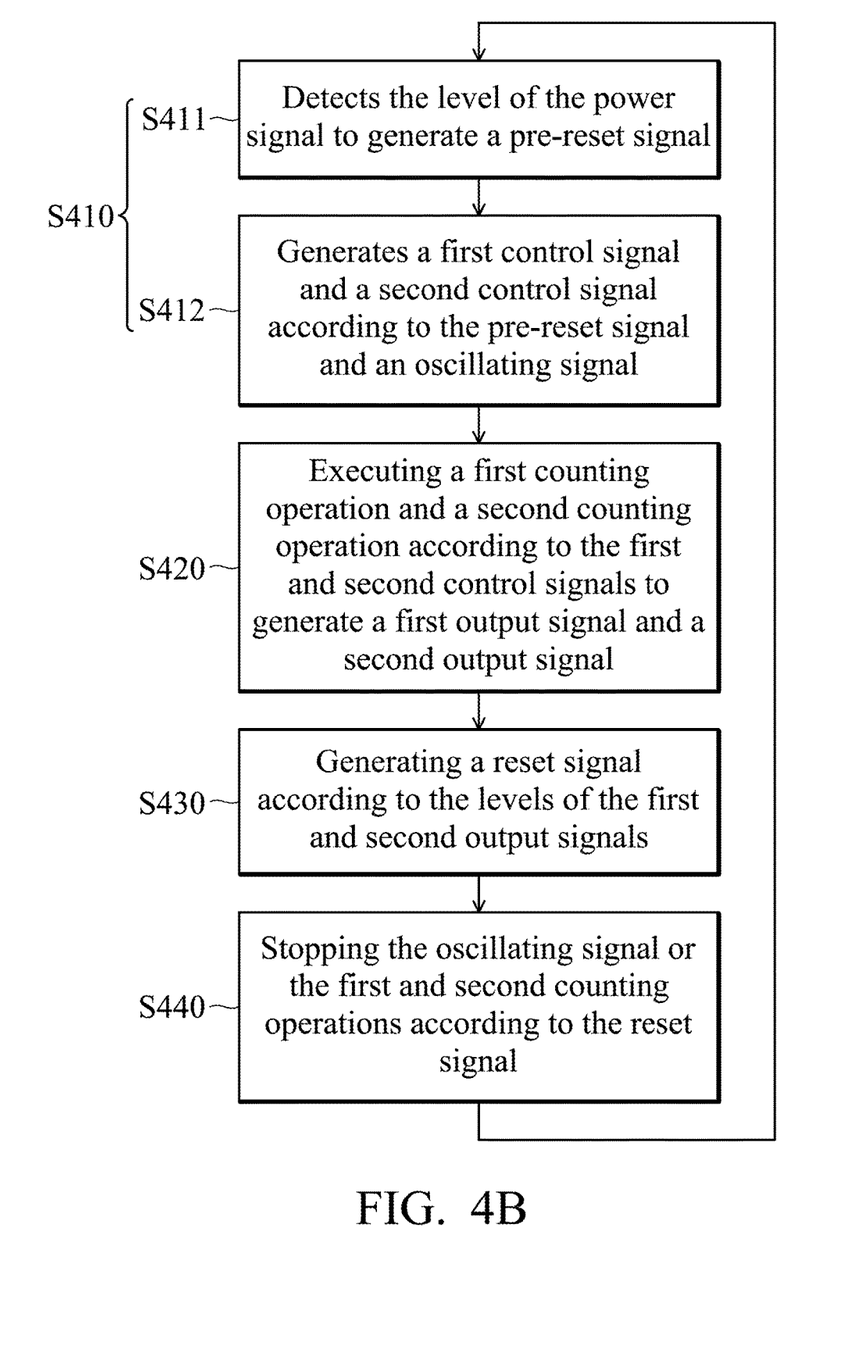
FIG. 4B is a flowchart of another exemplary embodiment of a control method, in accordance with some embodiments.

FIG. 4B is a flowchart of another exemplary embodiment of a control method, in accordance with some embodiments. FIG. 4B is similar to FIG. 4A except for the addition of step S440. The step S440 stops generating the oscillating signal or stops executing the first and second counting operations according to the reset signal. In another embodiment, step S440 stops generating the oscillating signal or stops executing the first and second counting operations according to the first and second output signals.

For example, when the level of the reset signal is at a non-reset level, such as the second level, it means that there is no need to reset the electrical elements which receive the reset signal $S_R$. Thus, in the step S440 the first and second counting operations are stopped. In one embodiment, in the step S440 generation of the oscillating signal is stopped. In another embodiment, in the step S440 only generation of the oscillating signal is stopped, and the first and second counting operations are executed.

According to the above description, the disturbance variation of the power signal can be determined according to the first and second counting operations. Thus, when the disturbance variation is small, the disturbance in the power signal is ignored, or the level of the reset signal is at a non-reset level to avoid the electrical elements being reset. When disturbance variation is great, the level of the reset signal is at a reset level to reset the electrical elements which receive the reset signal $S_R$. Additionally, when the level of the reset signal is at the non-reset level, the counting operations are stopped to save power.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A reset system comprising:
   a voltage detection device generating a pre-reset signal according to a power signal; and
   a control device comprising:
   a clock controller generating a first control signal and a second control signal according to a level of the pre-reset signal when a level of the power signal is higher than a pre-determined voltage level, wherein the clock controller comprising an input terminal configured to receive the pre-reset signal, a first output terminal configured to output the first control signal and a second output terminal configured to output the second control signal;
   a first counting unit counting according to the first control signal and generating a first output signal, wherein the first counting unit comprises an input terminal coupled to the first output terminal of the clock controller to receive the first control signal and an output terminal configured to output the first output signal, and wherein when a counting value of the first counting unit is equal to a first pre-determined value, the first output signal is at a first level, and when the counting value of the first counting unit is not equal to the first pre-determined value, the first output signal is at a second level;
   a second counting unit counting according to the second control signal and generating a second output signal, wherein the second counting unit comprises an input terminal coupled to the second output terminal of the clock controller to receive the second control signal and an output terminal configured to output the second output signal, and wherein when a counting value of the second counting unit is equal to a second pre-determined value, the second output signal is at the second level, and when the counting value of the second counting unit is not equal to the second pre-determined value, the second output signal is at the first level;
   a determination unit generating a reset signal according to the levels of the first and second output signals, wherein the determination unit comprising a first input terminal coupled to the output terminal of the first counting unit to receive the first output signal, a second input terminal coupled to the output terminal of the second counting unit to receive the second output signal and an output terminal configured to output the reset signal; and
   a control unit generating the first control signal according to the first output signal and a clock signal and generating the second control signal according to the second output signal and the clock signal,
   wherein when the pre-reset signal is changed from the first level to the second level and then is changed from the second level to the first level, the control unit utilizes the first control signal to activate the first counting unit, and when the pre-reset signal is at the second level, the control unit deactivates the first counting unit.

2. The reset system as claimed in claim 1, wherein when at least one of the first and second output signals is at the first level, the reset signal is at the first level.

3. The reset system as claimed in claim 1, wherein when the reset signal is at the second level, the first and second counting units stop counting.

4. The reset system as claimed in claim 1, wherein the clock controller comprises:
   an oscillator unit generating an oscillating signal; and
   a frequency divider processing the oscillating signal to generate the clock signal.

5. The reset system as claimed in claim 1, wherein when the level of the power signal is lower than a first voltage level, the pre-reset signal is at the first level, and when the level of the power signal is higher than or equal to the first voltage level, the pre-reset signal is at the second level.

6. The reset system as claimed in claim 5, wherein when the level of the power signal is lower than a second voltage level, the pre-reset signal is at the first level, and wherein the second voltage level is higher than the first voltage level, and wherein when the level of the power signal is higher than or equal to the second voltage level, the pre-reset signal is at the second level.

7. A control method comprising:
   generating a first control signal and a second control signal;
   executing a first counting operation according to the first control signal to generate a first counting value and generating a first output signal according to the first counting value, wherein when the first counting value is equal to a first pre-determined value, the first output signal is at a first level, and when the first counting value is not equal to the first pre-determined value, the first output signal is at a second level;
   executing a second counting operation according to the second control signal to generate a second counting value and generating a second output signal according to the second counting value, wherein when the second counting value is equal to a second pre-determined value, the second output signal is at the second level, and when the second counting value is not equal to the second pre-determined value, the second output signal is at the first level; and
   generating a reset signal according to levels of the first and second output signals,
   wherein said generating the first and second control signals comprises detecting a level of a power signal to generate a pre-reset signal, wherein when the pre-reset signal is at the first level and the level of the power signal is higher than a pre-determined voltage level, the first counting operation is executed,
   wherein when the level of the power signal is lower than a first voltage level, the pre-reset signal is at the first level, and when the level of the power signal is higher than or equal to the first voltage level, the pre-reset signal is at the second level, and
   wherein when the level of the power signal is lower than a second voltage level, the pre-reset signal is at the first level, and wherein the second voltage level is higher than the first voltage level, and wherein when the level of the power signal is higher than or equal to the second voltage level, the pre-reset signal is at the second level.

8. The control method as claimed in claim 7, wherein when at least one of the first and second output signals is at the first level, the reset signal is at the first level, and when each of the first and second output signals is at the second level, the reset signal is at the second level.

* * * * *